US010829296B2

(12) United States Patent
Phillips et al.

(10) Patent No.: US 10,829,296 B2
(45) Date of Patent: Nov. 10, 2020

(54) CAKE CONTAINERS

(71) Applicant: Leanne Phillips, Dunfermline Fife (GB)

(72) Inventors: Leanne Phillips, Dunfermline (GB); Keith Reeves, Glasgow (GB)

(73) Assignee: Leanne Phillips, Dunfermline Fife (GB)

(*) Notice: Subject to any disclaimer, the term of this patent is extended or adjusted under 35 U.S.C. 154(b) by 14 days.

(21) Appl. No.: 16/153,485

(22) Filed: Oct. 5, 2018

(65) Prior Publication Data
US 2019/0106270 A1  Apr. 11, 2019

(30) Foreign Application Priority Data

Oct. 5, 2017  (GB) .................................. 1716298.3

(51) Int. Cl.
*B65D 85/60* (2006.01)
*A47G 19/26* (2006.01)
(Continued)

(52) U.S. Cl.
CPC ............. *B65D 85/60* (2013.01); *A47G 19/26* (2013.01); *A47J 47/14* (2013.01); *B65D 21/083* (2013.01);
(Continued)

(58) Field of Classification Search
USPC ................... 220/4.26, 4.28, 4.29, 4.21, 4.33; 206/467, 756, 774
See application file for complete search history.

(56) References Cited

U.S. PATENT DOCUMENTS 1,950,118 A * 3/1934 Lifton ...................... A45C 5/03
 190/107
2,643,788 A * 6/1953 Burrows .................. B65D 7/24
 220/4.28
(Continued)

FOREIGN PATENT DOCUMENTS

AU  2014201882  10/2014
EP  2100545  9/2009
(Continued)

OTHER PUBLICATIONS

European Search Report of Related EP Application No. 18199009.4.

*Primary Examiner* — Jacob K Ackun
(74) *Attorney, Agent, or Firm* — Liu & Liu

(57) ABSTRACT

The invention relates to a portable container 10 for transporting a cake. The portable container comprises a container base 12 defining a support surface 22 for supporting a cake thereon. The portable container also comprises at least one container section 14. Each container section 14 is open at a top and at a bottom and defines a space which is enclosed by sides of the container section. The portable container further comprises a cover 18 defining a recess. The container base 12 and the container section 14 are releasably attached to each other whereby a lower part of a cake supported on the support surface is received in the space defined by the container section when the container base and the container section are attached to each other. The support surface 22 bounded by the sides of the container section 14 lies substantially in a single plane. The container section 14 and the cover 18 are releasably attached to each other whereby an upper part of the cake supported on the support surface 22 is received in the recess defined by the cover when the container section and the cover are attached to each other.

7 Claims, 3 Drawing Sheets

(51) Int. Cl.
*B65D 85/36* (2006.01)
*A47J 47/14* (2006.01)
*B65D 21/08* (2006.01)
*B65D 43/02* (2006.01)
*B65D 25/10* (2006.01)
*A47G 19/30* (2006.01)
*B65D 1/22* (2006.01)

(52) U.S. Cl.
CPC ......... *B65D 25/10* (2013.01); *B65D 43/0214* (2013.01); *B65D 85/36* (2013.01); *A47G 19/30* (2013.01); *A47G 2400/061* (2013.01); *B65D 1/22* (2013.01)

(56) References Cited

U.S. PATENT DOCUMENTS

| | | | | |
|---|---|---|---|---|
| 2,924,330 A * | 2/1960 | Ballard | | A47G 19/00 206/493 |
| 3,506,152 A * | 4/1970 | Stollman | | B65D 88/005 220/1.5 |
| 3,692,204 A * | 9/1972 | Provi | | B65D 15/22 220/4.29 |
| 4,231,453 A * | 11/1980 | Minor | | A45C 9/00 190/11 |
| 5,474,196 A * | 12/1995 | Fausel | | D06F 95/002 220/4.28 |
| 5,676,252 A * | 10/1997 | Lillelund | | A47G 19/26 206/551 |
| 5,865,889 A | 2/1999 | Birtalan et al. | | |
| 6,359,218 B1 * | 3/2002 | Koch | | H05K 5/0021 174/50 |
| 7,510,096 B2 * | 3/2009 | Wang | | B65D 21/0219 206/508 |
| 8,056,751 B2 * | 11/2011 | Vovan | | B65D 21/0222 206/508 |
| 8,235,217 B2 * | 8/2012 | Stolzman | | B65D 19/18 206/503 |
| 8,307,982 B1 * | 11/2012 | Vovan | | B65D 1/22 206/467 |
| 2004/0262306 A1 * | 12/2004 | Smith | | B65D 21/0228 220/4.26 |
| 2005/0127071 A1 * | 6/2005 | Khor | | B65D 45/20 220/4.28 |
| 2009/0294310 A1 * | 12/2009 | Franczyk | | B25H 3/021 206/229 |
| 2010/0200438 A1 * | 8/2010 | Davies | | B65D 21/083 206/223 |
| 2014/0262909 A1 * | 9/2014 | Gartz | | B65D 1/34 206/503 |
| 2014/0263305 A1 * | 9/2014 | Dowd | | B65D 25/00 220/4.28 |
| 2014/0360909 A1 | 12/2014 | Curtin et al. | | |
| 2015/0144519 A1 * | 5/2015 | Tapper | | A47F 7/0021 206/486 |
| 2015/0164089 A1 * | 6/2015 | Allison | | A21C 15/002 206/229 |
| 2015/0208840 A1 * | 7/2015 | Honeycutt | | A47G 19/30 414/800 |
| 2015/0351569 A1 | 12/2015 | Lordi | | |
| 2019/0082870 A1 * | 3/2019 | Kaupp | | A47G 19/26 |
| 2019/0387908 A1 * | 12/2019 | Leister | | A47G 19/26 |

FOREIGN PATENT DOCUMENTS

| | | |
|---|---|---|
| FR | 2491876 | 4/1982 |
| FR | 2550517 | 2/1985 |
| GB | 1024469 | 3/1966 |
| JP | 2000226086 | 8/2000 |
| JP | 2008308175 | 12/2008 |
| WO | 2012096584 | 7/2012 |
| WO | 2013031104 | 3/2013 |
| WO | 2014116030 | 7/2014 |
| WO | 2015044668 | 4/2015 |

* cited by examiner

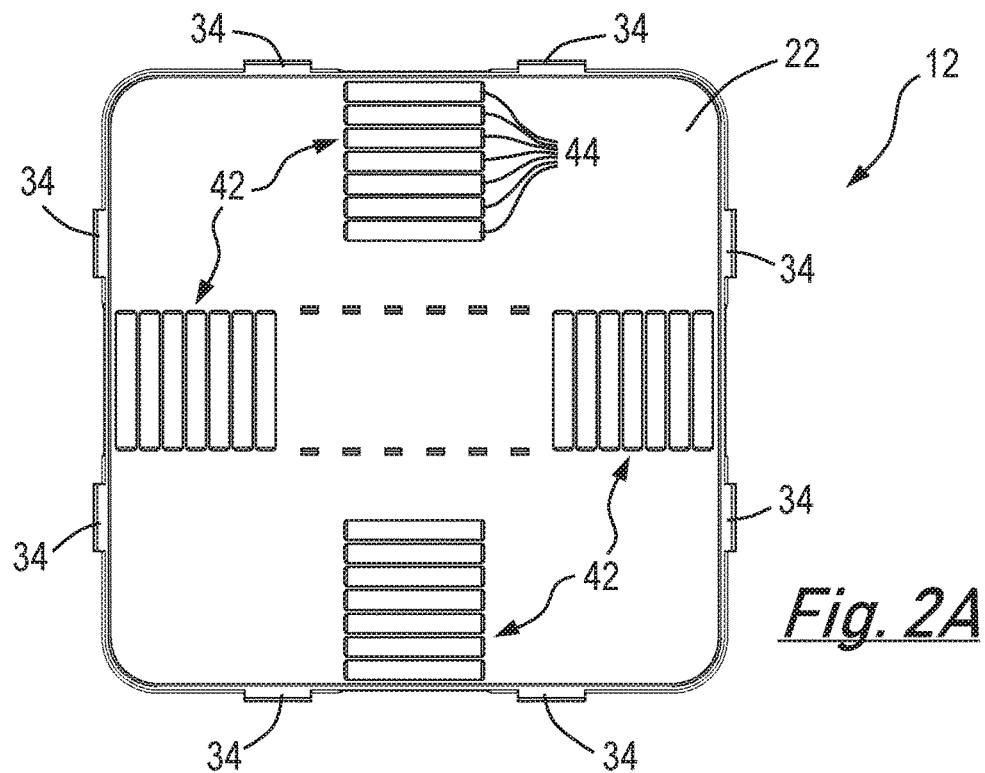
Fig.2A
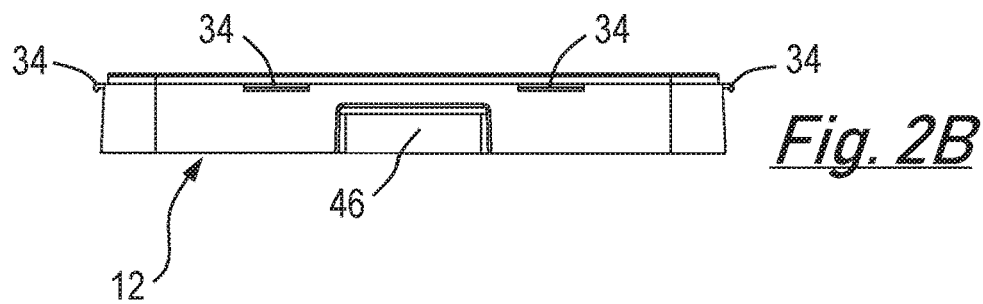
Fig.2B
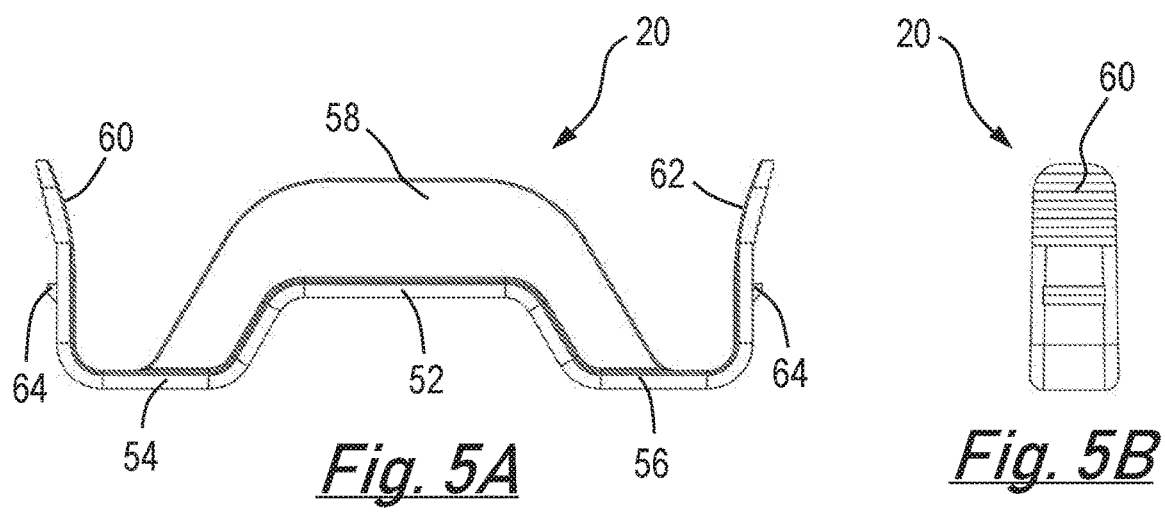
Fig.5A
Fig.5B

CAKE CONTAINERS

This application claims priority to GB Application No. 1716298.3, filed on Oct. 5, 2017, the subject matter of which is incorporated herein by reference.

FIELD OF THE INVENTION

The present invention relates to a cake container and more specifically to a portable container for containing and transporting a cake.

BACKGROUND ART

Cakes are difficult to transport because their size, weight and shape. Containers for transporting cakes are known. Known containers belong to one of two categories, i.e. cardboard containers and plastics containers. Cardboard containers are of varying shapes and sizes. However, cardboard containers lack rigidity and are liable to provide insufficient support especially if the cardboard becomes damp. Plastics containers are more rigid and are likewise of varying shapes and sizes. For example, single tier and multi-tier plastics containers are known with the latter typically being for transporting cupcakes.

The inventor became appreciative of shortcomings of known containers for transporting cakes and has developed an improved portable container for transporting cakes. It is therefore an object for the present invention to provide an improved container for transporting a cake.

STATEMENT OF INVENTION

According to a first aspect of the present invention there is provided a portable container for transporting a cake, the portable container comprising:
  a container base defining a support surface for supporting a cake thereon;
  at least one container section, each container section being open at a top and at a bottom and defining a space which is enclosed by sides of the container section; and
  a cover defining a recess,
  wherein the container base and the container section are releasably attached to each other whereby a lower part of a cake supported on the support surface is received in the space defined by the container section when the container base and the container section are attached to each other, the support surface bounded by the sides of the container section lying substantially in a single plane, and
  wherein the container section and the cover are releasably attached to each other whereby an upper part of the cake supported on the support surface is received in the recess defined by the cover when the container section and the cover are attached to each other.

The portable container for transporting a cake comprises a container base which defines a support surface for supporting a cake. The portable container also comprises at least one container section with each container section being open at a top and at a bottom and defining a space which is enclosed by sides of the container section. The portable container further comprises a cover which defines a recess. The container base and the container section releasably attach to each other whereby a lower part of a cake supported on the support surface is received in the space defined by the container section when the container base and the container section are attached to each other. The support surface bounded by the sides of the container section lies substantially in a single plane. A cake of substantial width and length may therefore be supported stably on the support surface. The container section and the cover are releasably attached to each other whereby an upper part of the cake supported on the support surface is received in the recess defined by the cover when the container section and the cover are attached to each other. The portable container is therefore configured to contain a cake of considerable height or a cake of two tiers, with the first, lower tier being received in the space defined by the container section and the second, upper tier being received in the recess defined by the cover. The portable container may comprise plural container sections which are attached one above the other, whereby cakes of three tiers or perhaps even more may be contained in the portable container.

As mentioned above, the support surface bounded by the sides of the container and more specifically all of the support surface bounded by the sides of the container lies substantially in a single plane. The support surface bounded by the sides of the container may have gaps and more specifically recesses. Nevertheless, a support surface having such gaps may still lie in a single plane. Recesses may, for example, be provided in the support surface to provide for ventilation. Alternatively or in addition, and as described further below, recesses may be provided to receive retaining members. The sides of the container section extend upwards from the container base substantially orthogonally to the support surface. A cake may therefore be supported such that sides of the cake are aligned with the sides of the container section.

A periphery of the container base may be substantially no higher than the support surface. The container base may therefore lack an upwardly projecting lip around the support surface. All of the support surface may lie substantially in a single plane. The part of the support surface not bounded by the sides of the container section, and which is therefore outside the container, may thus lie in the same plane as the part of the support surface bounded by the sides of the container section. A cake, such as a multi-tiered cake, may therefore be made at a location apart from the portable container and slid onto and over the container base until the cake is located in the middle of the support surface and without such movement being impeded by the like of a lip.

The container base may have an underside surface. The portable container may be placed such that the underside surface rests on the like of a worksurface. The underside surface may lie in a plane substantially parallel to the support surface. The support surface and underside surface may be substantially coextensive. Such a configuration may provide for stability of the potable container especially when containing a heavy cake. The container base may have at least one side which extends between the support surface and the underside surface. The at least one side may extend around the support surface. The at least one side of the container base may extend substantially orthogonally to the support surface.

The container base and the container section may be releasably attached by way of an attachment device comprising at least one first part on the container base and at least one second part on the container section. Respective first and second parts may interlock with each other to attach the container base and the container section to each other. The at least one second part may be at a free edge of the side of the container section. The first and second parts may interlock by movement of at least one of the first and second parts. More specifically, the second part may move in relation to the first part. The second part may be movable on the container section. The first part may have the form of a first attachment formation defined in the container base and more specifically a side of the container base. The first part may be towards an upper edge of the side of the container base. The second part may define a second attachment formation, the first and second attachment formations being configured to interlock with each other. The container section may comprise a hinge by which the second part moves on the container section. The hinge and the second part may be integrally formed with the container section. The hinge may therefore be a living hinge.

The first attachment formation may comprise an attachment aperture and the second attachment formation may comprise an attachment protrusion which extends from a side of the container base, the attachment protrusion being snugly received through the attachment aperture to provide for interlocking. Plural, such as four, attachment devices may be provided at spaced apart locations around the portable container to thereby provide for secure attachment of container section to container base.

The container section may comprise at least one first part of a further attachment device at an opposite end of the container section to the second part of the attachment device described above. A second container section may therefore be attached to the opposite, upper end of the first already attached container section by engagement of the first part of the further attachment device with a second part of the further attachment device comprised in the second container section.

Alternatively, and as described further below, the cover may be attached to the opposite, upper end of the already attached container section by engagement of the first part of the further attachment device with a second part of the further attachment device comprised in the cover.

The cover defines a recess. The cover may be closed at a top, open at a bottom and may define the recess by way of the closed top and sides of the cover. As described above, the cover may comprise a second part of an attachment device. The second part of the attachment device may be comprised in the cover at a free edge of the side of the cover. The cover may comprise a handle disposed to allow the portable container to be carried. The handle may be attached to the closed top of the cover.

The portable container may be lifted by other than the handle. The container base may be configured to allow the container base and hence the portable container to be supported by the fingers of each hand. The container base may define in each side of at least one pair of opposite sides a lifting recess of sufficient dimensions to admit the fingers. This enables the container base to be lifted between two hands.

The portable container may further comprise plural retaining members. The container base and each of the plural retaining members may be configured for releasable attachment of the retaining member to the container base. When attached the plural retaining members may extend up from the support surface at spaced apart locations to thereby form a structure for accomodating a bottom of a cake whereby movement of the cake across the support surface is restricted. Removal of the retaining members may be desired if there is no risk of movement of a cake across the support surface. Furthermore, removal of the retaining members may allow for a cake to be readily moved sideways onto the container base and over the support surface before the retaining members are reattached to the container base to hold the cake in place on the support surface.

The container base may define plural spaced apart recesses in the support surface and each retaining member may comprise a first retaining member portion which is received in a respective one of the plural recesses. The portable container may comprise four retaining members and the recesses may be spaced apart such that retaining members are, in use, disposed around the cake.

Each retaining member may comprise a second retaining member portion which, in use, extends up from the support surface and against which a side of the base of the cake bears to restrict movement of the cake across the container base. The second retaining member portion may be configured, such as in respect of dimensions, to present resistance to insertion of the retaining member portion into the bottom of a cake. The second retaining member portion may define a surface which lies in a plane or which define a curve. The retaining members may thus be shaped to accommodate cakes of different shapes, i.e. rectangular or circular. The second retaining member portion may define a surface which defines a right angle whereby the retaining member is shaped to accommodate a corner of a rectangular cake.

The first retaining member portion of a retaining member may comprise two spaced apart parts which extend beyond a middle part between the two spaced apart parts. A recess may have the form of a slot whereby the retaining member is attached to the container base by inserting the two spaced apart parts into the recess. The retaining member may comprise a detent whereby the retaining member is releasably held in a recess. A width of the retaining member portion, i.e. in a direction orthogonal to a direction of spacing apart of the two spaced apart parts, and the width of the recess may be such as to provide for a clearance fit of the retaining member in the recess. The retaining member may comprise a spine which defines a lower surface of the two spaced apart parts and the middle part. The spine may be of sheet form, albeit sheet form which follows a nonlinear path in the direction of the two spaced apart parts.

The retaining member may comprise a barrier portion which extends up from an upper surface of the spine and which extends along the middle part and along at least some of each of the two spaced apart parts. The spine may be configured such that it extends by way of first and second end parts away from the lower surface. Sides of the barrier portion may not extend as far as the first and second end parts. Each of the first and second end parts may be configured to resiliently flex in relation to the intervening part of the spine. Each of the first and second parts may define a locking profile which engages with the recess to hold the retaining member in place. Flexing of the first and second parts may provide for disengagement of the locking profile from the recess. Flexing of the first and second parts may, for example, be between finger and thumb. The spine may therefore be of finger width. The locking profile may comprise a protrusion on an outwardly facing surface of each of first and second parts, i.e. surface facing away from the barrier portion between the first and second parts where the retaining member comprises a barrier portion.

The container base and retaining members may be configured for attachment of each of the plural retaining members at a selected one of plural locations on the container base whereby different sizes of cake may be accommodated between the plural retaining members. The container may define plural sets of recesses, the sets of recesses being spaced apart from each other around the support surface. The recesses in a set may be spaced apart from each other in a direction away from the centre of the support surface towards an edge of the support surface. Where the portable container comprises four retaining members which are brought into use, the container may define four sets of recesses. Directions of spacing apart of recesses in adjacent sets of recesses may be at 90 degrees to each other.

The container base may be integrally formed. The container base may be formed from a plastics material, such as coloured polypropylene. The support surface defined by the container base may be generally and more specifically substantially square. Each of the container section and the cover may therefore be of generally and more specifically substantially square cross-section. The container section may be integrally formed. The container section may be formed from a plastics material, such as polypropylene. At least one of the container section and the cover may be transparent or perhaps translucent. The cover may be integrally formed. The cover may be formed from a plastics material, such as polypropylene. A cake contained in the portable container may thus be seen when the container section and the cover are in place. A retaining member may be formed from a plastics material, such as PC/ABS.

The inventor has appreciated the retaining members to be of wider applicability than hitherto described. Therefore, and according to a second aspect of the present invention, there is provided a portable container for transporting cakes comprising:
  a container base defining a support surface for supporting a cake;
  a cover arrangement defining a recess, the container base and the cover arrangement releasably attaching to each other whereby a cake supported on the support surface is received in the recess and is thereby enclosed by the container base and the cover arrangement when the container base and cover arrangement are attached to each other; and
  plural retaining members,
  wherein the container base and each of the plural retaining members is configured for releasable attachment of retaining member to the container base whereby the retaining members extend up from the support surface at spaced apart locations to thereby form a structure for accommodating a bottom of a cake and in which the retaining members abut against a side of the cake whereby movement of the cake across the support surface is restricted.

The cover arrangement may comprise at least one container section and a cover as described above with reference to the first aspect of the present invention. The part of the retaining member which, in use, extends up from the support surface may be configured, such as in respect of dimensions, to present resistance to insertion of the extending part into the bottom of a cake. For example, the part of the retaining member which extends up from the support surface may be of at least a finger's width. Further embodiments of the second aspect of the present invention may comprise one or more features of the first aspect of the present invention.

According to a further aspect of the present invention there is provided a container for transporting a cake, the container comprising: a container base defining a support surface for supporting a cake; at least one container section, each container section being open at a top and at a bottom and defining a space which is enclosed by sides of the container section; and a cover defining a recess, the container base and the container section releasably attaching to each other whereby a lower part of a cake supported on the support surface is received in the space defined by the container section when the container base and the container section are attached, and the container section and the cover releasably attaching to each other whereby an upper part of the cake supported on the support surface is received in the recess defined by the cover when the container section and the cover are attached.

Embodiments of the further aspect of the present invention may comprise one or more features of the first aspect of the present invention.

According to a further aspect of the present invention there is provided a portable container for transporting cakes comprising: a container base defining a support surface for supporting a cake; a cover arrangement defining a recess, the container base and the cover arrangement releasably attaching to each other whereby a cake supported on the support surface is received in the recess and is thereby enclosed by the container base and the cover arrangement when the container base and cover arrangement are attached to each other; and plural retaining members, the container base and each of the plural retaining members being configured for releasable attachment of retaining member to the container base whereby the retaining members extend up from the support surface at spaced apart locations to thereby form a structure for accommodating a bottom of a cake whereby movement of the cake across the support surface is restricted.

Embodiments of the yet further aspect of the present invention may comprise one or more features of the first aspect of the present invention.

BRIEF DESCRIPTION OF DRAWINGS

Further features and advantages of the present invention will become apparent from the following specific description, which is given by way of example only and with reference to the accompanying drawings, in which:

FIG. 2A is a view from above of the container base of the portable container of FIG. 1;

FIG. 2B is a view from one side of the container base of FIG. 2A;

FIG. 5A is a view from a side of a retaining member of the portable container of FIG. 1; and FIG. 5B is a view from an end of the retaining member of FIG. 5A.

DESCRIPTION OF EMBODIMENTS

Figure 1:
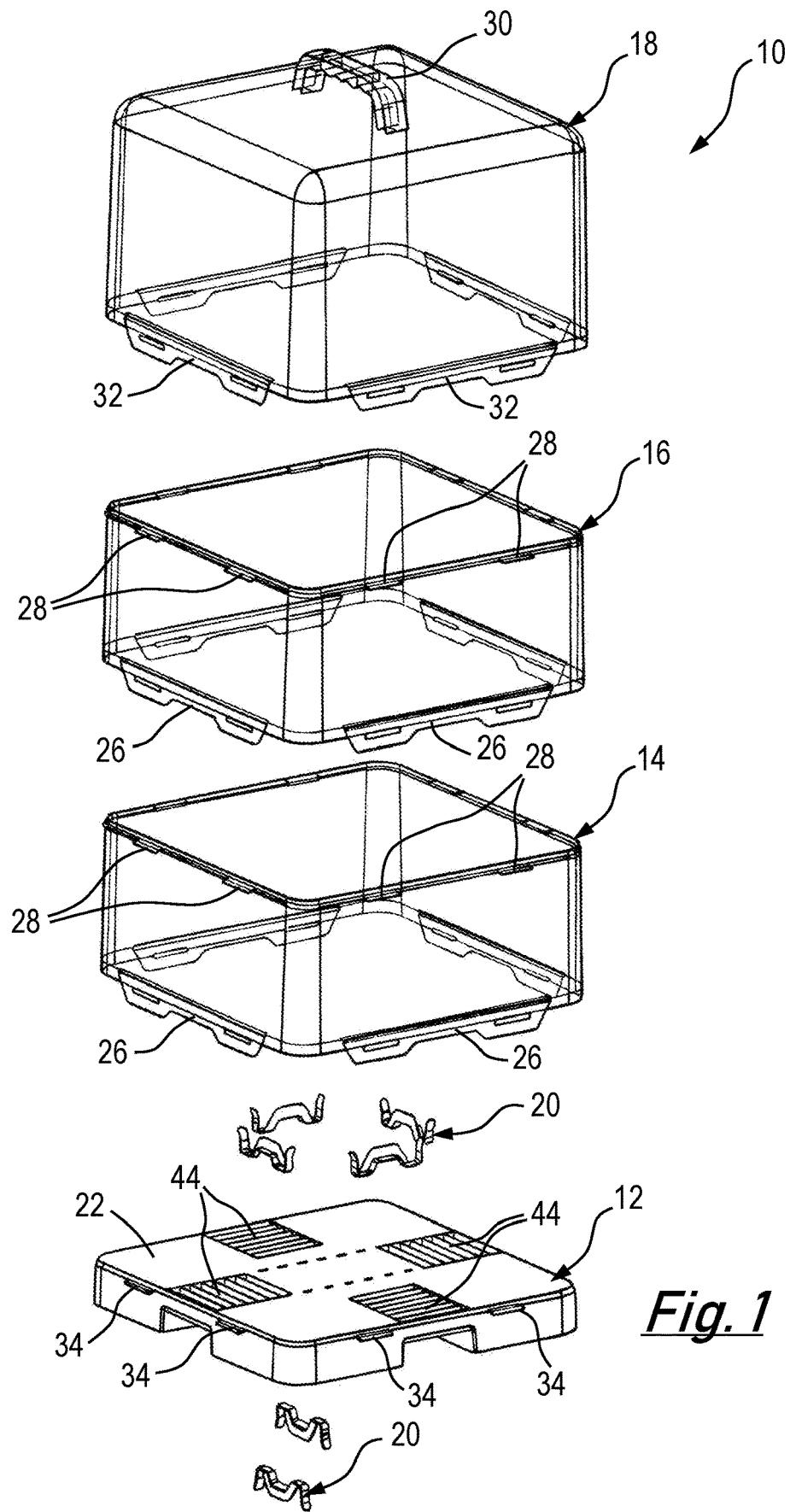
FIG. 1 is a perspective view from above and one corner of an embodiment of portable container for transporting cakes.

A perspective view from above and one corner of an embodiment of portable container 10 for transporting cakes is shown in FIG. 1. The portable container 10 comprises a container base 12, a first container section 14, a second container section 16 and a cover 18. The portable container 10 comprises six retaining members 20. As described in more detail below, four of the six retaining members 20 are used to prevent movement of a cake across the container base. The remaining two members 20 are stored in clips formed in the underside of the container base 12. The underside of the container base 12 defines sufficient number of clips to hold all the retaining members 20 when the retaining members are not in use. The container base 12 defines a substantially square support surface 22 for supporting a multi-tiered cake on its upper surface.

Figure 3A:
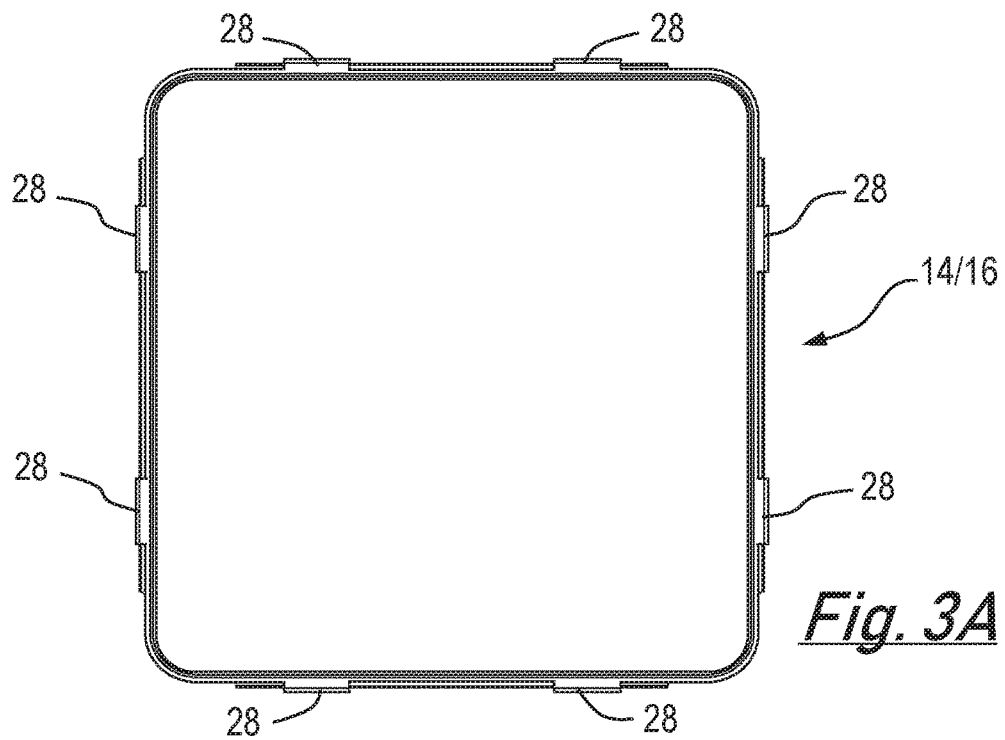
FIG. 3A is a view from above of a container section of the portable container of FIG. 1.
Figure 3B:
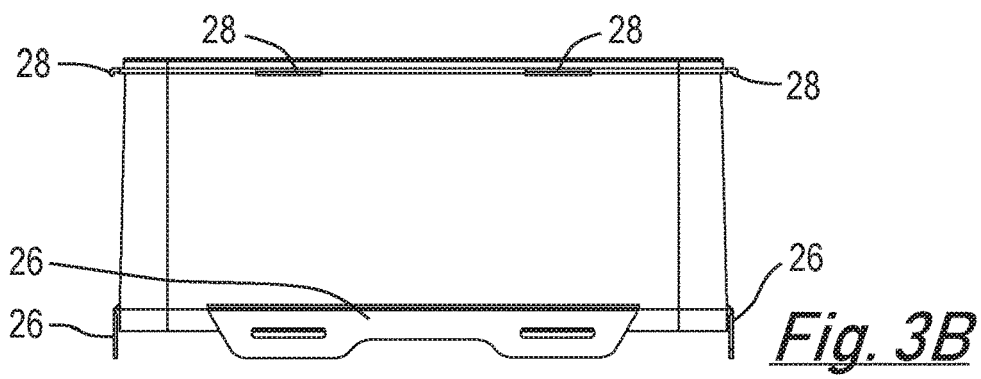
FIG. 3B is a view from one side of the container section of FIG. 3A.
Figure 4:
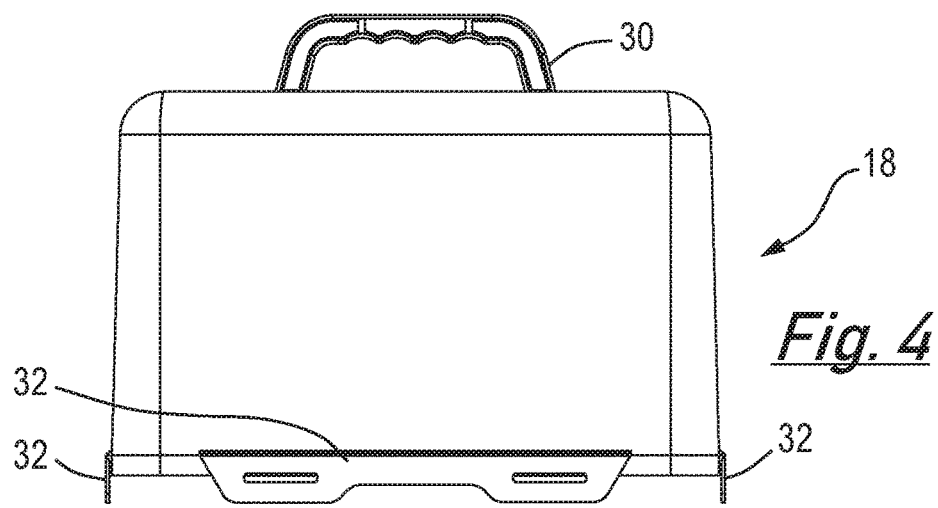
FIG. 4 is a view from one side of the cover of the portable container of FIG. 1.

The container base is integrally formed from polypropylene which is coloured whereby the container base is opaque. The container base is described in more detail below with reference to FIGS. 2A and 2B. Each of the first and second container sections 14, 16 is open at a top and at a bottom and defines a space of substantially square cross-section which is enclosed by four sides of the container section. Each container section 14, 16 is integrally formed from polypropylene. As shown in more detail in FIGS. 3A and 3B, each container section 14, 16 comprises a living hinge 26 at the lower edge of each of the four sides. Each living hinge defines two elongate apertures spaced along the edge. Each container section 14, 16 further comprises two integrally formed elongate protrusions 28 at the upper edge of the outer surface of each of the four sides. The two elongate protrusions 28 are spaced apart along the upper edge at locations corresponding respectively to the elongate apertures of the living hinge 26. Furthermore, each elongate protrusion 28 and a corresponding aperture are sized and shaped such that the protrusion is a snap fit in the aperture in accordance with known practice for hinged connectors of this form. The cover 18 is closed at the top, open at the bottom and defines its recess of square cross-section by way of the closed top and four sides of the cover. The cover 18 comprises a handle 30 which is in the centre of the closed top of the cover and extends from the exterior upper surface of the cover. As is shown in more detail in FIG. 4, the cover 18 also comprises a living hinge 32 at the free edge of each of the four sides of the cover. Each living hinge 32 of the cover is of the same form and function as the living hinges 26 of the container sections 14, 16. The cover 18 is integrally formed from polypropylene. Each retaining member 20 is integrally formed from PC/ABS.

The portable container 10 is brought into use by locating a multi-tiered cake on the support surface 22 of the container base 12. According to a first example approach, the multi-tiered cake is formed in-situ on the container base 12. According to a second example approach, the multi-tiered cake is formed apart from the container base 12 and when complete is moved sideways onto the support surface 22 of the container base 12. The multi-tiered cake is then held in position on the support surface 22 against movement across the support surface by way of four of the retaining members 20. As described further below, each of the retaining members 20 is inserted in a respective slot 44 formed in the support surface 22 such that the retaining members are spaced around the cake and abut against the side of the bottom of the cake. For example, where the cake is of square footprint, a retaining member 20 is located against each of the four sides at the bottom of the cake. The first container section 14 is then lowered over the container base 12 such that the cake is received in the space defined by the first container section. When the lower edge of the first container section 14 abuts against the periphery of the container base 12, each of the four living hinges 26 of the first container section 14 is rotated downwards until it engages with the corresponding protrusion 34 which extends from the side of the container base 12 near the upper edge of the container base. The four living hinges 26 of the first container section 14 and the protrusions 34 of the container base 12 constitute a first plurality of attachment devices.

The second container section 16 is then lowered over the first container section 14 such that a further part of the cake is received in the space defined by the second container section. When the lower edge of the second container section 16 abuts against the upper edge of the first container section 14, each of the four living hinges 26 of the second container section 16 is rotated downwards until it engages with the corresponding protrusion 28 on the side of the first container section 14 near the upper edge of the first container section. Finally, the cover 18 is placed over the second container section 16 such that the remaining part of the cake is received in the recess defined by the cover. When the lower edge of the cover 18 abuts against the upper edge of the second container section 16, each of the four living hinges 32 of the cover 18 is rotated downwards until it engages with the corresponding protrusion 28 on the side of the second container section 16 near the upper edge of the second container section. The four living hinges 26 of the second container section 16 and the cover 18 and the protrusions of the first container section 14 constitute a second plurality of attachment devices. The container base 12, the first and second container sections 14, 16 and the cover 18 are thus all held securely together whereby the portable container 10 may be lifted by the handle for transport of the cake elsewhere. Alternatively, and for example where the cake to be transported is particularly heavy, the portable container 10 may be lifted by way of the container base 12 as described below with reference to FIG. 2B.

FIGS. 2A and 2B are views from above and from one side respectively of the container base 12 of the portable container 10 of FIG. 1. Further features of the container base 12 will now be described. Four sets 42 of slots 44 are defined in the support surface 22. The slots 44 in each set 42 of slots 44 are spaced apart from each other in a direction which extends away from the centre of the support surface 22 towards an edge of the support surface. Directions of spacing apart of slots 44 in adjacent sets 42 of slots 44 are at 90 degrees to each other. A retaining member 20 is inserted into one of the slots 44 in each set 42 of slots 44 whereby cakes of different sizes may be accommodated. As may be seen from FIG. 2B, a lifting recess 46 is defined in the side of the container base 12. The lifting recess 46 is of sufficient dimensions to admit the fingers of one hand. A lifting recess 46 is defined in each of the four sides of the container base 12. The portable container 10 may be lifted by inserting the fingers of each of two hands in a respective one of two lifting recesses 46 on opposite sides of the container base 12.

The retaining member 20 will now be described in more detail with reference to FIGS. 5A and 5B which provide side and end views respectively of the retaining member. The retaining member 20 comprises a spine of sheet form, albeit sheet form which follows a nonlinear path and which defines a lower and two outwardly and hence oppositely directed side surfaces of the retaining member. A centre part of the spine defines the lower surface of a middle part 52. The spine extends from each side of the middle part and away from the middle part to define first and second protrusions 54, 56 on each side of the middle part. A central portion of retaining member 20 is constituted by the middle part 52 and the first and second protrusions 54, 56. The spine further extends at the distal end of each of the first and second protrusions 54, 56 away from the lower surface of the first and second protrusions to define first and second end parts 60, 62. The first and second end parts 60, 62 respectively constitute first and second arms.

As may be seen from FIG. 5B, the spine and hence the first and second end parts 60, 62 are of finger width. The retaining member 20 comprises a barrier portion 58 which extends up from an upper surface of the spine and which extends along the middle part 52 and part way along each of the first and second protrusions 54, 56. Ends of the barrier portion 58 therefore do not extend as far as the first and second end parts 60, 62. Each of the first and second end parts 60, 62 is such that it resiliently flexes in relation to the intervening parts of the retaining member 20. Each of the first and second end parts 60, 62 defines a locking protrusion 64, which constitutes a locking portion, on its outwardly directed surface. The width and length of the retaining member 20 and each slot 44 formed in the support surface 22 are such that the first and second protrusions 54, 56 are a clearance fit in the slot. The retaining member 20 is locked in position in a slot 44 by applying pressure to the first and second end parts 60, 62 between thumb and forefinger whereby the first and second protrusions 54, 56 are drawn towards each other and to an extent sufficient to enable the retaining member to be fully inserted into the slot such that the locking protrusions 64 are received beyond the support surface 22. The first and second end parts 60, 62 are then released whereby the first and second end parts 60, 62 spring apart such that the locking protrusions 64 extend underneath the support surface 22 to thereby lock the retaining member 20 in place. The retaining member 20 is removed by applying pressure to the first and second end parts 60, 62 between thumb and forefinger whereby the locking protrusions 64 are withdrawn allowing the retaining member to be withdrawn from the slot 44.

The invention claimed is:

1. A portable container for transporting a cake, the portable container comprising:
   a container base defining a support surface for supporting a cake thereon;
   at least one container section, each container section being open at a top and at a bottom and defining a space which is enclosed by sides of the container section;
   a cover defining a recess; and
   plural retaining members,
   wherein the container base and the container section are releasably attached to each other whereby, in use, a lower part of a cake supported on the support surface is received in the space defined by the container section when the container base and the container section are attached to each other, the support surface lying substantially in a single plane,
   wherein the container section and the cover are releasably attached to each other whereby, in use, an upper part of the cake supported on the support surface is received in the recess defined by the cover when the container section and the cover are attached to each other,
   wherein the container base and each of the plural retaining members is configured for releasable attachment of the retaining member to the container base whereby the plural retaining members extend up from the support surface at spaced apart locations to form a structure for accommodating a bottom of a cake, the structure when in use restricting movement of the cake across the support surface,
   wherein the container base defines plural spaced apart slots in the support surface and each retaining member comprises a first retaining member portion and a second retaining member portion, the first retaining member portion received in a respective one of the plural slots, and the second retaining member portion extending up from the support surface, the second retaining member portion presenting a barrier when in use to movement of the cake across the support surface, and
   wherein the retaining member is formed of resilient material whereby the first retaining member portion is admitted through a slot when the retaining member is manually deformed, at least one locking portion of the retaining member extending behind and beyond the slot after admission of the first retaining member portion through the slot and upon release from deformation.

2. The portable container of claim 1, wherein the container base and the container section are releasably attached by a first plurality of attachment devices, each attachment device comprising at least one first part protrusion extending from a side of on the container base and at least one aperture defined by a living hinge at a free edge of the side of the container section, respective at least one protrusion and at least one aperture having cooperating profiles which interlock with each other upon movement of the living hinge to attach the container base and the container section to each other.

3. The portable container of claim 2, further comprising a second plurality of attachment devices, each attachment device of the second plurality of attachment devices comprising at least one protrusion, and at least one aperture defined by a living hinge, wherein the at least one protrusion of each attachment device of the second plurality of attachment devices extends from the side of the container section at a second end of the container section opposite a first end of the container section having the living hinge of each attachment device of the first plurality of attachment devices, and wherein the living hinge of each attachment device of the second plurality of attachment devices is comprised in a second container section or in the cover, whereby the second container section or the cover is attached to the second end of the container section.

4. The portable container of claim 3, wherein the cover has a closed top and an open bottom, with the recess of the cover being defined by the closed top and sides of the cover, and wherein the living hinge of each attachment device of the second plurality of attachment devices is mounted at a free edge of a side of the cover.

5. The portable container of claim 1, wherein the container base defines a lifting recess of sufficient dimensions to admit fingers of a hand in each side of at least one pair of opposite sides of the container base.

6. The portable container of claim 1, wherein a plurality of spaced apart slots is defined in the support surface for each of the plural retaining members, the plurality of spaced apart slots being spaced apart from each other across the support surface in a direction away from a centre of the support surface, each of the plural retaining members being received in a selected slot of a respective plurality of spaced apart slots.

7. The portable container of claim 1, wherein the retaining member comprises first and second arms and a central portion, each of the first and second arms extending orthogonally from a respective end of the central portion, the first arm defining a first locking portion on a surface directed away from the central portion, the second arm defining a second locking portion on a surface directed away from the central portion, the retaining member being deformed by moving the first and second arms towards each other to allow for admission of the retaining member through the slot.

* * * * *